United States Patent [19]

United States Patent [19]
Pich et al.

[11] 4,340,614
[45] Jul. 20, 1982

[54] STRINGENTLY SODIUM-RESTRICTED DIETETIC SALT AND ITS PREPARATION

[75] Inventors: Claus H. Pich; Thomas Moest, both of Moorrege, Fed. Rep. of Germany

[73] Assignee: BASF Aktiengesellschaft, Fed. Rep. of Germany

[21] Appl. No.: 267,870

[22] Filed: May 28, 1981

[30] Foreign Application Priority Data

Jun. 6, 1980 [DE] Fed. Rep. of Germany ....... 3021298

[51] Int. Cl.³ .............................................. A23L 1/237
[52] U.S. Cl. .................................................... 426/649
[58] Field of Search ........................................ 426/649

[56] References Cited

U.S. PATENT DOCUMENTS

| | | | |
|---|---|---|---|
| 2,742,366 | 4/1956 | Power | 426/649 |
| 2,829,056 | 4/1958 | Kemmerer | 426/649 |
| 3,505,082 | 4/1970 | Miller | 426/649 |
| 4,066,799 | 1/1978 | Cornelius et al. | 426/649 X |
| 4,107,346 | 8/1978 | Kravitz | 426/648 |
| 4,216,244 | 8/1980 | Allen et al. | 426/649 |
| 4,243,691 | 1/1981 | Mohlenkamp et al. | 426/649 |

FOREIGN PATENT DOCUMENTS 2527003 1/1976 Fed. Rep. of Germany .
2657913 6/1977 Fed. Rep. of Germany .

OTHER PUBLICATIONS

Medical Tribune 27 (1978), p. 24.

*Primary Examiner*—Joseph M. Golian
*Attorney, Agent, or Firm*—Keil & Witherspoon

[57] ABSTRACT

A stringently sodium-restricted dietetic salt consisting of a mixture of from 60 to 85% by weight of potassium chloride, from 10 to 30% by weight of potassium adipate, from 2 to 5% by weight of potassium tartrate, from 0.5 to 2% by weight of potassium glutamate, from 0.5 to 2% by weight of adipic acid and a total of from 0.004 to 0.06% by weight of potassium inosate and/or potassium guanylate, and the preparation of the salt in a fluidized bed apparatus.

4 Claims, No Drawings

STRINGENTLY SODIUM-RESTRICTED DIETETIC SALT AND ITS PREPARATION

It is a well-known fact that a diet devoid of common salt is unacceptably insipid. However, sodium-restricted dietetic salts are needed, since many people must, for medical reasons, severely restrict their intake of sodium ions. This applies particularly to the large number of people suffering from high blood pressure. In the Federal Republic of Germany alone, 3 million are known to suffer from hypertension, and it can be assumed that another 3 to 6 million have high blood pressure without being aware of the fact, and are therefore particularly subject to health hazard. In ths context, it may be mentioned that Japan is the country with the highest average common salt consumption in the world.

As a rule, potassium salts are used as a substitute for common salt. In addition, under certain circumstances in long-term therapy of high blood pressure with diuretics and/or beta-blockers, potassium substitution is also necessary.

A range of common salt substitutes based on potassium compounds is known. These substitutes have the disadvantage of an unpleasant, bitter, metallic and in some cases acid taste. Furthermore, their use characteristics are in many cases unsatisfactory; for example, the products may not give a clear solution in water, they may be inadequately free-flowing because of an inhomogeneous particle structure and because of hygroscopicity, they may have too high a content of fines, or they may tend to separate.

German Laid-Open Application DOS No. 2,527,003 describes the improvement in the taste of potassium salts by the use of sweeteners. This improvement does not conform to what is needed in a salt substitute. In practice, it is found that the specific taste of potassium ions becomes, if anything, even more unpleasant by the addition of sweeteners, and accordingly a tasting panel was unable to confirm that the intended change in taste, to come closer to that of common salt, had been achieved.

U.S. Pat. No. 3,505,082 describes, for example, the taste correction of potassium chloride with fumaric acid. However, the effect must be regarded as only very slight. The partial replacement of common salt by glycinamide hydrochloride, described in German Published Application DAS No. 2,657,913, also seems to entail some problems, since the compound is under certain circumstances a potential health hazard and is not permitted under German Food and Requisites Law.

The commercially obtainable common salt substitutes in particular exhibit the especially unpleasant, bitter, metallic taste of potassium chloride. Attempts to compensate this with organic acids and with potassium glutamate have, in most of the products, been taken to excess, so that whilst the taste is different, it is not significantly better, nor has it been changed in the direction of the taste of sodium chloride. When salting food of different types of taste, which are usually accentuated with common salt, the dominance of a specific intrinsic taste in a salt naturally manifests itself particularly unpleasantly if this intrinsic taste does not harmonize with the food taste which is to be accentuated. Thus, a salt with a glutamate taste emphasis is pleasant in consomme, but objectionable in a cucumber salad, whilst a celery note can enhance the taste of cucumber salad but is considered extremely objectionable in mashed potato.

On this scheme of assessment, a comparative investigation of seven commercial products, reported in Medical Tribune 27 (1978), 24, showed that not a single product even approximated to the taste quality of common salt. Even on inclusion of a further 11 commercial dietetic salts, in similarly designed taste comparison tests, no product having a satisfactory taste was found.

It is an object of the present invention to provide a stringently sodium-restricted dietetic salt which avoids the taste disadvantages and which, in its use characteristics, also conforms to all requirements.

We have found that this object is achieved by providing a stringently sodium-restricted dietetic salt which consists of a mixture of from 60 to 85% by weight of potassium chloride, from 10 to 30% by weight of potassium adipate, from 2 to 5% by weight of potassium tartrate from 0.5 to 2% by weight of potassium glutamate, from 0.5 to 2% by weight of adipic acid and a total of from 0.004 to 0.06% by weight of potassium inosate and/or potassium guanylate. The invention also provides the preparation of this salt in a fluidized bed apparatus.

Surprisingly, the combination according to the invention exhibits a taste which substantially corresponds to that of sodium chloride and is exceptionally well-suited to enhancing the taste of food without having to resort to sodium chloride.

The dietetic salt according to the invention is universally applicable, ie. both in food in which the salt mixture is dissolved and in food onto the surface of which the salt is sprinkled in an undissolved form, as, for example, with boiled eggs.

By way of explanation, it should be recorded that the term "stringently sodium-restricted" means that the sodium content is less than 40 mg/100 g, this being the definition in the German Food and Requisites Law.

The salts used are employed in a commercially available quality permitted under foodstuff laws.

With a view to the preparation of the mixture and the flow characteristics of the potassium chloride employed, it is preferred to use a potassium chloride which contains from 0.2 to 1.0% by weight, especially from 0.5 to 0.8% by weight, of highly disperse silica. The addition of adipic acid provides a slightly acid component which has an advantageous effect on the taste. It is interesting that the relatively small amounts of potassium inosate and/or potassium guanylate added have an advantageous effect on the taste, so that, surprisingly, it is not directly discernible that the product is a sodium-restricted dietetic salt.

In an improved and especially preferred embodiment, a residual slightly metallic aftertaste typical of potassium ions is compensated by adding appropriate flavorings in an amount of from 0.005 to 0.1% by weight, based on total weight.

Flavorings which have proved particularly suitable for eliminating the well-known potassium ion aftertaste are considered, by experts, to be of the barbecue type of taste.

Such flavoring combinations, as a rule in the form of liquid reddish brown sauces of various compositions, are in particular mixtures of wine vinegar, mustard, tomato puree, sugar, vegetable oil, salt, Worcester sauce, various spices etc., or a composition comprising tomato puree mixed with meat juice, tomato ketchup, horseradish, garlic juice and onion juice, flavored with mustard powder, salt, chilli powder, cayenne pepper, sugar, tarragon vinegar, A1-sauce and Worcester sauce, as described, for example, in the Dr. Oetker Warenkunde-Lexikon, 10th edition, or in Lexikon der Küche, 17th edition.

Such flavoring combinations contain flavorings which belong to the chemical categories of the aldehydes, ketones, mercaptans and unsaturated alcohols and which are isolated from spice extracts or vegetable extracts, such as cloves, capsicum, nutmeg, allspice, pepper, celery, parsley, carrots and onions and can be enhanced with synthetic flavorings such as methylheptenone, dimethyl sulfide, methional, hex-2-en-1-ol and hex-3-en-1-ol. A suitable flavoring combination is sold, for example, under the name "Barbecue" by Firmenich GmbH.

It is interesting that no such flavored dietetic salts are commercially available, nor has an improvement in the taste of dietetic salts by flavoring been described. The amount used, namely from 0.005 to 0.1% by weight, causes neither an objectionable intrinsic odor nor an intrinsic taste of the dietetic salt according to the invention.

The minimum requirements to allow practical use of a dietetic salt are a pure white color, a particle size distribution corresponding to that of common salt, complete solubility in water, stability on boiling, free flow, freedom from dust, non-hygroscopic behavior, no tendency to separate, and a virtually neutral pH of the aqueous solution, namely from 6 to 8.

A product having these use characteristics cannot be obtained directly by simply mixing the constituents involved in the composition according to the invention. A direct mixture of this type is not fully water-soluble, because of the highly disperse silica used to assist the flow of potassium chloride, and would also not be free-flowing because of the inhomogeneous particle structure and because of the hygroscopicity of the potassium salts. Furthermore, it would dust, because of the fines in the components, and would show separation phenomena because of the differing particle structures of the various components.

We have found, surprisingly, that by using a specific granulating process, namely fluidized bed spray granulation, a dietetic salt mixture which conforms to the above requirements is obtained.

Accordingly, the invention also relates to a process for the preparation of a stringently sodium-restricted dietetic salt, having the composition according to the invention, in which from 90 to 100, preferably from 95 to 100, % by weight of the potassium chloride to be used, the total amount of the potassium adipate and from 50 to 100, preferably from 70 to 90, % by weight of the adipic acid to be used are introduced, as dry material, into a fluidized bed apparatus, the dry material is heated to 60°–90° C., preferably 70°–80° C., by the air introduced, and the remainder of the salt, dissolved in an amount of water equal to from 10 to 70% by weight of the dry material initially introduced, is sprayed onto the dry material, after which the product is dried.

The preparation is carried out in a conventional fluidized bed apparatus, as obtainable, for example, from Glatt or from Aeromatik. The process according to the invention can, for example, be carried out on a relatively small scale in a Glatt WSG 5 apparatus, or on a larger scale in an Aeromatik apparatus, size VI.

During the stage of pre-heating the salt mixture initially introduced into the fluidized bed apparatus, the silica, which may have been added as a conventional flow promoter to the potassium chloride, is blown out. As a rule, a period of from 5 to 15 minutes suffices to remove the silica. The fact that all has been removed is recognizable by, for example, there being no further observable raising of dust. This treatment ensures that the product is fully soluble in water. The remaining quantity of salt is sprayed as an aqueous solution onto the initial charge at an air inlet temperature of 60°–90° C., using a spray granulation technique. The subsequent drying is advantageously carried out at from 70° to 90° C. A dustless, free-flowing granular material, corresponding in particle size to conventional common salt, is obtained.

The flavoring agent which may be used is added to the spraying solution which contains the remainder of the salt, dissolved in water.

The fact—astonishing to a skilled worker—that this product remains free-flowing without added auxiliaries is explicable by the specific process technology used, by means of which a dustless granular material having a homogeneous structure can be produced, in which the individual granules are no longer hygroscopic, probably because the kinetics of water absorption have been considerably retarded.

The Examples shown in Table 1 illustrate the invention.

In Table 1 the symbols have the following meaning:

$x$ % by weight of the total potassium chloride, the total amount of the potassium adipate and $y$ % by weight of the total adipic acid are heated in a fluidized bed spraying-granulating unit for a period of $a$ minutes at an air entry temperature of $b$.

The remaining constituents are dissolved in $z$ %, based on total weight of the dry composition, of water and the solution is sprayed onto the initial charge of salts, at an air entry temperature of $b$, such that the air exit temperature remains at $c$.

After completion of the spraying process, drying is continued, at an air entry temperature $d$, until the air exit temperature has reached a value $e$.

A white, fine, dustless, homogeneous and very free-flowing granular material is produced, which is nonhygroscopic, gives a clear solution in water, and shows no tendency to demix.

In 2% strength aqueous solution, the product has a pH of $f$.

TABLE 1

| Additive | Units | Example 1 | Example 2 | Example 3 | Example 4 | Example 5 |
|---|---|---|---|---|---|---|
| K Cl+ | % | 60.99 | 84.95 | 75.2 | 80.44 | 69.96 |
| K adipate | % | 30.0 | 11.0 | 20.0 | 15.0 | 26.0 |
| K tartrate | % | 5.0 | 2.0 | 3.0 | 3.0 | 2.25 |
| K glutamate | % | 2.0 | 0.5 | 1.5 | 0.5 | 1.0 |
| K guanylate | % | 0.01 | — | 0.005 | 0.05 | 0.01 |
| K inosate | % | — | 0.05 | 0.005 | 0.005 | 0.01 |
| adipic acid | % | 2.0 | 1.5 | 0.2 | 1.0 | 0.75 |
| flavoring++ | % | — | — | 0.09 | 0.005 | 0.02 |
| x, proportion | % | 100 | 100 | 90 | 100 | 100 |
| y, proportion | % | 90 | 100 | 50 | 85 | 75 |
| a, time | min | 5 | 10 | 10 | 15 | 10 |
| b, temp | °C. | 90 | 70 | 80 | 60 | 80 |
| z, proportion | % | 30 | 70 | 70 | 40 | 20 |
| c, temp | °C. | 45 | 40 | 40 | 30 | 40 |
| d, temp | °C. | 80 | 70 | 80 | 80 | 80 |
| e, temp | °C. | 70 | 60 | 65 | 65 | 70 |
| f, pH | — | 6.6 | 7.0 | 7.9 | 7.5 | 7.6 |

+containing 0.5% of highly disperse silica
++"Barbecue" flavoring from Firmenich GmbH

RE EXAMPLE 1

In an assessment test procedure, the salt and its aqueous solutions in 1.5-2 and 3% strength concentrations were tasted, in comparison with common salt and its corresponding solutions, by a test panel of 8 persons, of whom 5 were men, including a professional chef. The differences in individual assessments were slight. The salt according to the invention was generally considered to have a pleasant taste.

RE EXAMPLE 2

This salt was employed in a test meal, in dishes of different types of taste which are usually enhanced with common salt, and the taste was assessed by a panel of 7 persons, including 5 men, amongst them a professional chef, in comparison with the corresponding dishes spiced with common salt, and without any salt.

Both in the case of those dishes where the added common salt had been dissolved and boiled, as with beef stew and chicken consomme, and in those where the salt was dissolved but had not been boiled, as in the case of mashed potatoes, as well as in the case of dishes in which the salt was completely or partially undissolved, as with cucumber salad, cottage cheese and eggs, all members of the test panel considered the improvement in taste achievable by the salt according to the invention, compared to the dishes without salt, to be significant or outstanding.

The differences between the dishes spiced with common salt and spiced with the salt according to the invention were considered to be insignificant.

RE EXAMPLE 3

This product was tasted by a panel of 16 persons, including 12 men, amongst them 2 professional chefs. The product was tasted in solid form and in solutions of 1, 1.5, 2 and 3% concentration, in comparison with common salt, 3 commercial dietetic salts A, B and C, and the corresponding solutions of each.

Product A, whose solutions had to be filtered because of the partial insolubility of the material, was characterized as bitter, dull, inedible, very metallic and even slightly astringent.

Product B, whose solutions were highly opalescent and could not be filtered, was conspicuous for its strongly glutamate-like, dull acid taste with a pronounced metallic aftertaste, whilst product C, which, though soluble, was barely free-flowing, because of its hygroscopicity, was considered to have a peculiar spiciness, to be unpleasantly celery-like and to be reminiscent of celery with a metallic component.

The product according to the invention was clearly and unambiguously considered superior to all commercial products; all members of the panel found it to be pleasantly salty or resembling common salt, and one taster even confused it with common salt.

RE EXAMPLE 4

This product, used in examples of basic dishes, was compared, similarly to Example 2, with the unspiced dishes, the dishes spiced with common salt and the dishes spiced with commercial product B. The test panel comprised 11 persons, including 8 men, amongst them 1 professional chef.

All dishes spiced with product B were rejected by every one of the tasters, since the metallic taste of the product persisted in the dishes. Only in beef consomme and chicken consomme was the product regarded as tolerable, if used in small doses, but then the total spicing effect was so slight that the dishes were considered to be dull.

The product according to the invention was classified as having excellent spicing properties and being equivalent with common salt.

RE EXAMPLE 5

The product according to the invention was employed as the sole salt in a lunch in a factory canteen. The lunch offered a choice of the following two menus:
1st menu:
  Beef consomme with noodles
  Goulash with pasta
  Green Salad
2nd menu:
  Beef consomme with noodles
  Roast meat with boiled potatoes and mixed vegetables
  Mixed salad, comprising lettuce, cucumber and tomatoes.

There were no complaints from any of the 340 lunchers, the amount of food left on the plates was no greater than usual, and the number of requests for second helpings was of the normal order of magnitude.

Individually interviewed lunchers were completely surprised to learn that the meal had been spiced with a dietetic salt instead of with common salt.

We claim:

1. A stringently sodium-restricted dietetic salt, consisting of a mixture of from 60 to 85% by weight of potassium chloride, from 10 to 30% by weight of potassium adipate, from 2 to 5% by weight of potassium tartrate, from 0.5 to 2% by weight of potassium glutamate, from 0.5 to 2% by weight of adipic acid and a total of from 0.004 to 0.06% by weight of potassium inosate and/or potassium guanylate.

2. A stringently sodium-restricted dietetic salt as claimed in claim 1, which additionally contains a flavoring agent, which compensates the potassion ion aftertaste, in an amount of from 0.005 to 0.1% by weight, based on total weight.

3. A process for the preparation of a stringently sodium-restricted dietetic salt as claimed in claim 1 or 2, wherein 90-100% by weight of the potassium chloride to be used, the total amount of the potassium adipate and from 50 to 100% by weight of the adipic acid to be used are introduced, as dry material, into a fluidized bed apparatus, the dry material is heated to 60°-90° C., by the air introduced, and the remainder of the salt, dissolved in an amount of water equal to from 10 to 70% by weight of the dry material initially introduced, is sprayed onto the dry material, after which the product is dried.

4. A process for the preparation of a stringently sodium-restricted dietetic salt as claimed in claim 3, wherein a flavoring agent which compensates the potassium ion aftertaste is added to the spraying solution in an amount of from 0.005 to 0.1% by weight, based on total dry weight.

* * * * *